C. LIGHTFOOT.
HYDRAULIC BACK PRESSURE VALVE.
APPLICATION FILED JAN. 26, 1912.
1,045,715.
Patented Nov. 26, 1912.
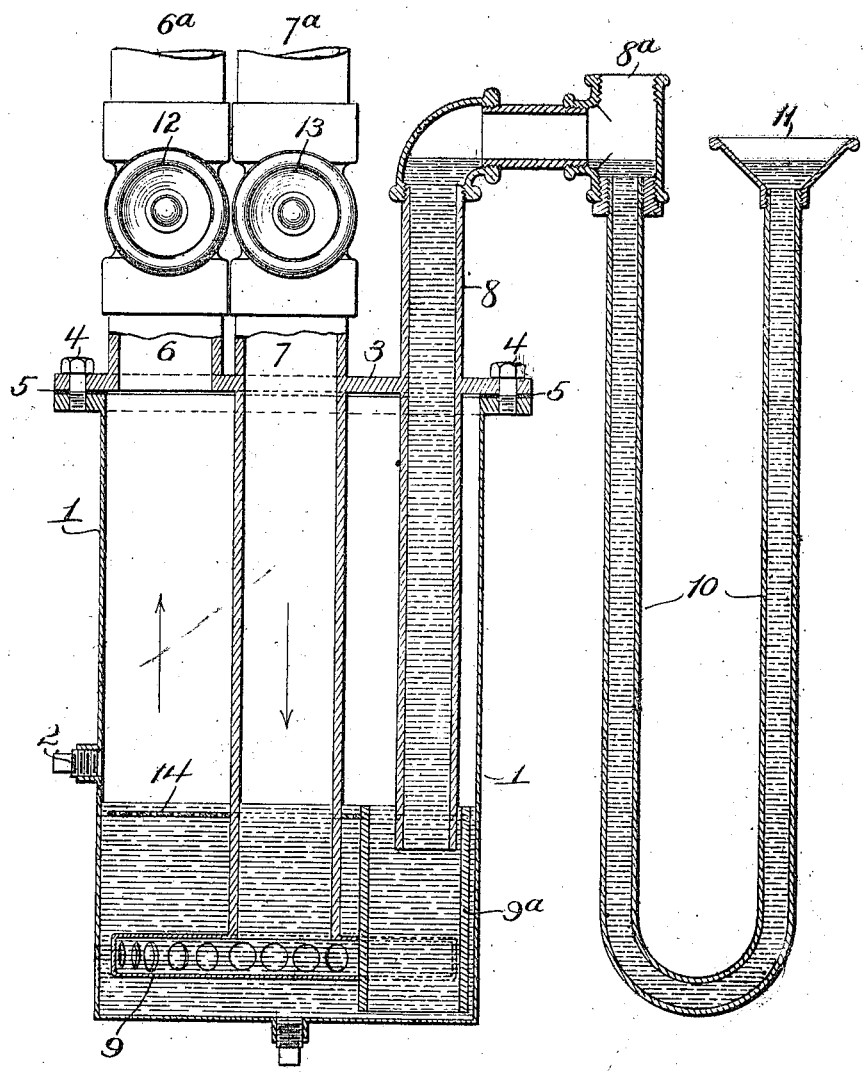

UNITED STATES PATENT OFFICE.

CECIL LIGHTFOOT, OF BUFFALO, NEW YORK, ASSIGNOR TO OXWELD ACETYLENE COMPANY, OF CHICAGO, ILLINOIS.

HYDRAULIC BACK-PRESSURE VALVE.

1,045,715.  Specification of Letters Patent.  Patented Nov. 26, 1912.

Application filed January 26, 1912. Serial No. 673,605.

*To all whom it may concern:*

Be it known that I, CECIL LIGHTFOOT, a subject of King George V, of Buffalo, in the county of Erie and State of New York, have invented certain new and useful Improvements in Hydraulic Back-Pressure Valves; and I do hereby declare the following to be a full, clear, and exact description of the invention, such as will enable others skilled in the art to which it appertains to make and use the same.

My invention relates to an improvement in hydraulic back-pressure valves, designed particularly for use in connection with gas-blow-pipes using a mixture of gases drawn from independent sources, the object being to prevent a reversal of the flow of one gas into and toward the source of the other, and it consists in the parts and combinations of parts as will be more fully described and pointed out in the claims.

The accompanying drawing is a view in vertical section of one form of apparatus embodying my invention.

For the purpose of describing this invention, it will be assumed that one gas is oxygen under considerable pressure in a cylinder, and the other gas is acetylene under very low pressure flowing from an acetylene generator, the two gases being employed together in a blow-pipe.

1 represents a cylinder or tank, which, at the commencement of the operation is filled with water up to the plug 2. This tank is provided with a cover 3 secured thereto by screws 4 or by other suitable fastening devices, a packing 5 being interposed to prevent the leakage of any gas.

Formed integral with the cover 3, or secured thereto in any suitable manner, are the three pipes 6, 7 and 8, the former of which terminates preferably in the plane of the cover, while the pipes 7 and 8 project down below the water level, the pipe 7 terminating in a perforated head or drum 9, the latter being in a plane below the lower end of pipe 8. The three pipes 6, 7 and 8 project above the cover, the pipe 6 being connected with the outlet pipe 6ª, the pipe 7 with the inlet pipe 7ª and the pipe 8 with the vent pipe 8ª. The lower end of the seal pipe 8 is surrounded by a sleeve or short section of pipe 9ª which extends from approximately the plane of the normal water level in the cylinder 1 below the lower end of pipe 7, but is open at its bottom for the free entrance of water.

Pipe 8 is of a length slightly greater than the height of a column of water sustained by the pressure at which the acetylene gas is delivered to the tank, and as before explained is water sealed and opens at its upper end into vent pipe 8ª, which is connected in a plane below the vent opening with the U-shaped tube 10, which is provided at its free end with a filling funnel 11.

Cock 12 is interposed in a coupling between pipes 6ª and 6, and cock 13 is interposed between pipes 7ª and 7 so that communication between these pipes 6ª and 7ª and the cylinder 1 may be cut off.

In the operation of the apparatus the cocks 13 and 12 are closed, the plug 2 removed, and water poured into the filling funnel 11 until it fills the tank up to the opening closed by plug 2. Plug 2 is now replaced and cock 13 opened, thus permitting the acetylene gas from the generator to enter pipe 7 and tank 1 and force some of the water in the latter, into pipe 8, until the latter contains a column of water equal in height to a column of water that would be formed by the pressure of gas in the acetylene gas generator. In so doing the level of the water will be lowered in the tank by an amount corresponding to the volume of the column of water in pipe 8. Cock 12 should now be opened and the incoming gas from the generator will then bubble up through the water and pass out through the outlet pipe 6ª to the blow pipe.

Should any pressure be produced in the outlet pipes 6ª and 6 in excess of the pressure existing in pipe 7, the excess of pressure in pipe 6 and tank 1 will cause the water in tank 1 to flow up through pipe 8 and over into the U-shaped tube 10, which in time will overflow at 11, until enough water has been forced out of the tank to lower the level until the lower end of pipe 8 is no longer immersed, thus permitting the gas to escape through pipe 8 and vent 8ª to the outer air.

As the lower end of inlet pipe is at a lower level than pipe 8, the inlet pipe will still be submerged after pipe 8 has been opened to the atmosphere, so that no gas can by any possibility, pass back into delivery pipe 7, and as the U-shaped tube is also filled with water, none of the escaping gas can pass into the building in which the apparatus is placed, hence the U-shaped tube, acts both as a seal, and indicates that the gas is escaping through the vent. The pipe 9ª surrounding the lower end of pipe 8, maintains the water around the latter in a quiet state, and prevents the bubbles of gas escaping from the head or drum 9, from passing up through pipe 8 and breaking or interfering with the water seal therein.

14 is a perforated baffle plate located within tank 1 just slightly below the normal level of the water therein.

From the construction disclosed it is also evident that if a lower pressure or vacuum should be created in tank 1 due to a failure of acetylene gas supply, the water in pipe 8 would fall and permit air to enter through the vent.

Slight changes might be made in the general form and arrangement of the parts described without departing from my invention, and hence I do not restrict myself to the precise details set forth but consider myself at liberty to make such slight changes and alterations as fairly fall within the spirit and scope of my invention.

Having fully described my invention what I claim as new and desire to secure by Letters-Patent, is:

1. A hydraulic back pressure valve comprising a tank and its cover the latter carrying an inlet pipe, an outlet pipe and a combined seal and vent pipe, the inlet pipe terminating below the lower end of the seal and vent pipe and also below the lower end of the outlet pipe.

2. A hydraulic back pressure valve comprising a tank having a water outlet located at the normal water level, means for closing said opening and a cover carrying an inlet pipe, an outlet pipe and a combined seal and vent pipe, the latter terminating below the inner end of outlet pipe but above the lower end of said inlet pipe, the lower ends of said inlet and combined seal and vent pipe being below the normal water level.

3. A hydraulic back pressure valve comprising a closed tank, an inlet pipe leading into the tank and provided at its lower end below normal water level with a perforated head, an outlet pipe communicating with the tank with its lower end above the water level, and a combined seal and vent pipe terminating above the discharge end of the inlet pipe but below the lower end of outlet pipe, and a sleeve open at its top and bottom and surmounting the lower end of the combined seal and vent pipe.

4. A hydraulic back pressure valve comprising a closed tank, inlet and outlet pipes and a combined seal and vent pipe communicating with said tank above the bottom of the latter, the said seal and vent pipe terminating below the lower end of the outlet pipe, but above the lower end of the inlet pipe, and a bent pipe connected with the combined vent and seal pipe at the upper end seal section of the latter and adapted to receive the overflow from the latter.

5. A hydraulic back pressure valve comprising a closed tank, inlet and outlet pipes and a combined seal and vent pipe communicating with said tank above the bottom of the latter the said seal and vent pipe terminating below the lower end of the outlet pipe, but above the lower end of the inlet pipe and an indicator pipe communicating with the combined vent and seal pipe at the upper end of the seal section of said pipe, so as to receive the overflow from the latter.

In testimony whereof, I have signed this specification in the presence of two subscribing witnesses.

CECIL LIGHTFOOT.

Witnesses:
THOS. J. MATHEWS, Jr.,
C. H. O. JENKINS.